United States Patent [19]

Adelman

[11] Patent Number: 4,461,858

[45] Date of Patent: Jul. 24, 1984

[54] POLYVINYLALCOHOL/MELAMINE-FORMALDEHYDE INTERACTION PRODUCTS

[75] Inventor: Robert L. Adelman, Wilmington, Del.

[73] Assignee: E. I. Du Pont de Nemours and Company, Wilmington, Del.

[21] Appl. No.: 323,053

[22] Filed: Nov. 19, 1981

Related U.S. Application Data

[63] Continuation-in-part of Ser. No. 147,057, May 16, 1980, abandoned.

[51] Int. Cl.$^3$ .............................................. C08L 3/10
[52] U.S. Cl. ..................................... 524/49; 524/501; 524/502; 524/503; 524/512; 525/58
[58] Field of Search ................. 524/503, 49, 501, 843, 524/502, 512, 803; 525/58; 106/210

[56] References Cited

U.S. PATENT DOCUMENTS

| | | | |
|---|---|---|---|
| 2,876,136 | 3/1959 | Ford | 427/366 |
| 2,998,344 | 8/1961 | Carlson | 162/157 R |
| 3,002,881 | 10/1961 | McDonnell et al. | 162/166 |
| 3,051,691 | 8/1962 | Elizer et al. | 525/56 |
| 3,067,160 | 12/1962 | Van Loo | 260/29.4 UA |
| 3,424,650 | 1/1969 | Jurisch et al. | 162/175 |
| 3,594,271 | 7/1971 | Woodberry | 162/167 |
| 3,597,313 | 8/1971 | Williams et al. | 162/164 R |
| 3,630,831 | 12/1971 | Jungetzes | 162/168 R |
| 3,772,407 | 11/1973 | Williams et al. | 162/166 |
| 4,029,885 | 6/1977 | Buikema | 536/50 |
| 4,094,718 | 6/1978 | Czerwin | 260/17.3 |

FOREIGN PATENT DOCUMENTS

| | | | |
|---|---|---|---|
| 632596 | 12/1961 | Canada | 260/29.4 UA |
| 551950 | 3/1943 | United Kingdom . | |

OTHER PUBLICATIONS

Kuhn et al., "Crosslinking of Single Linear Macromolecules", Journal of Poly. Sci., vol. 57 (1962), pp. 311–319.
Pritchard, "Polyvinyl Alc.", (1970), p. 15.

Primary Examiner—Theodore E. Pertilla

[57] ABSTRACT

Stable aqueous solutions of cationic polyvinylalcohol/melamine-formaldehyde resin interaction products are provided comprising polyvinyl alcohol polymer and cationic melamine-formaldehyde resin acid colloid in a polyvinylalcohol/melamine-formaldehyde resin acid colloid weight ratio, on a dry basis, of from about 0.4/1 to about 5/1, and sufficient water to give a solids content of from about 0.7% by weight up to a level that will not cause gelation to a stage of no flow under the force of gravity in 48 hours but not in excess of 6% by weight. These aqueous polyvinylalcohol/melamine-formaldehyde interaction products have good stability, and high absorption capacity onto cellulose pulp. The use of these interaction products in paper making results in increased processing capability and improved wet and dry strength of the paper.

16 Claims, No Drawings

POLYVINYLALCOHOL/MELAMINE-FORMALDEHYDE INTERACTION PRODUCTS

This application is a continuation-in-part of copending application Ser. No. 147,057, filed May 16, 1980 abandoned.

BACKGROUND OF THE INVENTION

1. Field of the Invention

This invention relates to polyvinyl alcohol and more specifically it relates to stable aqueous polyvinyl alcohol/melamine-formaldehyde resin interaction products.

2. Description of the Prior Art

There are numerous commercial wet end additives being used in paper making at the present. These have many limitations. Some examples of the additives used most commonly, are as follows.

Cationic starches are often used for improving retention of cellulosic fines, filler and pigment, and also for increasing the dry strength of the resulting paper. However, such improvements are generally modest, and at the same time cationic starch use can lead to irregularities in performance (irreproducibility of batches, low solution stability, low wet strength), incompatibility with other components in the furnish (alum, size, other salts), and high biological oxygen demand (BOD) for additive not on the pulp or recycled, and which is lost in the waste water.

Other wet-end additives are often used to confer permanent wet strength to the resulting paper, such as cationic urea-formaldehyde UF resins, amine-containing polyamides treated with epoxides (e.g., Hercules' "Kymene"557) or melamine-formaldehyde (MF) resins (e.g., "Parez"607 of American Cyanamid). However, UF resins are slow curing on the machine, while the polyamides are relatively expensive, slow to adsorb on the cellulose pulp, and make repulping of the paper relatively difficult. The MF resins show poor pigment and filler retention, and also exhibit low water absorbency, whereas absorbency is often desired along with wet strength. All of these types of additives give only modest enhancement of dry strength. Also, none of the above types are now recognized as improvers of wet web strength (at their usual concentration of application) which would permit greater production control and in some cases, increased productivity.

Conventional soluble polyvinyl alcohol in the form of powder, granules or chopped fiber has been used in Japan as an additive in the wet-end of a paper-making machine. Increased paper strength and oil resistance was disclosed. However, careful control of polyvinyl alcohol particle size, preliminary heat treatment, and degree of hydrolysis of the polyvinyl alcohol is required. Similarly, careful control of the temperature, and level of water pickup by the particles and the forming paper is required before passing through the drier rolls (see "Polyvinyl Alcohol", edited by C. A. Finch, Wiley, N.Y. (1973) pp 301-305). As these particles are nonionic, low retention of fines would be expected and as they are non-curing have no wet strength capability.

The use of melamine-formaldehyde resins as wet-end additives to give high wet strength papers is well known (see C. S. Maxwell's review in TAPPI Monograph No. 29, "Wet Strength in Paper and Paperboard, Editor J. P. Weidner (1965), pages 20-32.

The interaction of starch and the cationic precondensate of melamine-formaldehyde to make a cationic starch (promoting adsorption of the binder) is disclosed in U.S. Pat. No. 2,998,344 (cf. column 3). No concentration effects were indicated as important. Also the product was unsatisfactory per se as a binder for cellulosic pulp (cf. column 6).

U.S. Pat. No. 3,594,271 disclosed aqueous acidic colloidal solutions of a cationic reaction product of a cationic thermosetting melamine-formaldehyde acid colloid with 5 to 50 times its weight of a water soluble starch and the process of treating paper therewith. Such products are disclosed to give good adsorption on the fibers and enhanced dry strength coupled with low wet strength. Total solids content of the mixture is 2–10%, but it is indicated that "this is not critical," (column 2). It was also disclosed that the low wet strength is a result of the low concentration of the melamine-formaldehyde resin relative to the starch.

U.S. Pat. No. 3,424,650 disclosed that starch reacted with formaldehyde-guanidine-melamine resins was rendered much more adsorptive to cellulose fibers. Inclusion of all three materials as reactants in 9–14/0.4–1.6/0.4–1.6 ratios, respectively, was critical in order to produce a relatively stable resin and for sufficient activity for increasing dry strength of paper articles by prior reaction with starch. Also concentration of reactants can be 1–40% by weight.

A combination of a guanidine-formaldehyde resin and a hydrocolloid (such as starch or polyvinyl alcohol), in about 2/1 ratio by weight, is disclosed in U.S. Pat. No. 3,002,881 as a good wet end additive, increasing the wet strength of the resulting paper. Presumably, components are added independently to the dilute pulp slurry. There is no indication of prereaction of resin and polyvinyl alcohol, because of lack of stability of premixes (cf. column 5).

The advantages of using a cationic material (cationic starch) at the wet-end of a papermaking machine are disclosed in U.S. Pat. No. 4,029,885.

Other methods to prepare cationic highly adsorbant polyvinyl alcohols have also been described. However, these would be at higher costs and/or would offer problems with a toxic reactant. These are as follow:

U.S. Pat. Nos. 3,597,313 and 3,772,407 disclose copolymers of vinyl alcohol modified with cationic monomers.

U.S. Pat. No. 3,051,691 discloses that polyvinyl alcohol and calcium cyanamide form cationic polymeric polyols that are substantive to cellulose.

The use of polyvinyl alcohol plus methylol melamines (the monomeric -melamine-formaldehyde) in paper coatings is described in British Pat. No. 551,950 Application as a textile finish is disclosed in U.S. Pat. No. 2,876,136. In the latter, reaction between the two components probably didn't take place until after application to the substrate (the catalyst was added at this point). The polyvinyl alcohol/methylol compound ratio disclosed was from 1/1 to 1/125.

U.S. Pat. No. 3,067,160 disclosed that the addition of even small amounts of polyvinyl alcohol to cationic melamine-formaldehyde resin acid colloids (methyl ether form) was unsuccessful. Such systems were very unstable and gelled thus indicating that one would not expect stable melamine-formaldehyde acid colloid solutions containing polyvinyl alcohol.

It has been known for a long time that addition of a crosslinking agent to polyvinyl alcohol in aqueous solution at moderate-to-elevated concentrations, will lead to gel formation, but if the solution is dilute enough intramolecular interaction will occur almost exclusively, so that no gel would form (cf. W. Kuhn and G. Balmer, Journal of Polymer Science Vol. 57 page 311-319 (1962). Further the work of these authors indicates that in reaction of a polyvinyl alcohol having a degree of polymerization on the order of 1000-2000, with a highly functional cross-linking agent such as the melamine-formaldehyde resin acid colloid (and with the latter at a concentration of as high as 20 to 100% by weight of the PVA), a very low concentration of the PVA must be present (est. 0.3-0.5%) to prevent gelation. Thus it is surprising that interaction of PVA and the MF resin acid colloid can occur in solution concentrations as high as 3.75% to give stable yet active systems even with extensive heating of the solution.

These authors indicate that complete separation of the polymer chains is necessary for this dilution effect to occur. Other workers also indicated that complete separations of molecules of polyvinyl alcohol require concentrations below 0.25%., and that if concentration is increased to about 0.9% the swollen polymer coils must interpenetrate, and entanglements become quite important [cf. "Polyvinyl alcohol", by J. G. Pritchard, Gorden and Breach, NYD, (1979), page 15].

U.S. Pat. No. 3,630,831 disclosed a suspension of a binding agent for nonwoven materials prepared by dispersing particles of a polymer swellable in cold water and soluble in warm water (e.g., starch or polyvinyl alcohol) in a solution of a cross-linking agent (e.g., formaldehyde) and a cross-linking catalyst (e.g., HCl) wherein the particles swell and absorb the solution. At room temperature, the cross-linking agent partially reacts and the suspension is then diluted. The binding agent is added to a fiber slurry and a web is formed which is heated to at least 140° C. to complete the cross-linking of the polymer.

SUMMARY OF THE INVENTION

According to the present invention there is provided a stable aqueous polyvinylalcohol/melamine-formaldehyde resin interaction product comprising polyvinyl alcohol polymer and cationic melamine-formaldehyde resin acid colloid in a polyvinylalcohol/melamine-formaldehyde resin acid colloid weight ratio, on a dry basis, of from about 0.4/1 to about 5/1, and sufficient water to give a solids content of from about 0.7% by weight up to a level that will not cause gelation to a stage of no flow under the force of gravity but not in excess of 6% by weight.

Further provided according to the present invention are processes for preparing the stable aqueous polyvinylalcohol/melamine-formaldehyde resin interaction product of the present invention.

Still further provided according to the present invention are processes to increase the wet strength, dry strength and other properties of a product derived from fibrous cellulosic materials and of paper by treating the fibrous cellulosic materials or the paper pulp with the products of the present invention, and the resulting paper having improved properties.

As used herein the word "stable" in the context of stable aqueous polyvinyl alcohol/melamine-formaldehyde resin interaction product means that gelation to a stage of no flow under the force of gravity does not occur within 48 hours.

DETAILED DESCRIPTION OF THE INVENTION

Contrary to the indications of the above referred to prior art and very surprisingly it was discovered that blends of polyvinyl alcohol and cationic melamine-formaldehyde resin acid colloid can interact in solutions at concentrations as high as about 3% or even higher at temperatures of up to 85°-90° C., for 1-2 hours, if desired without leading to appreciable levels of gel or loss of adsorption activity of the interaction product to cellulose. This discovery renders the polyvinyl alcohol/melamine-formaldehyde interaction commercially feasible, as these concentrations and reaction rate permit equipment already employed for solutions of cationic starch added to the paper machine in order to obtain improved properties.

The limitations of the prior art wet-end additives discussed above are alleviated by the use of the polyvinyl alcohol/melamine-formaldehyde resin interaction products of the present invention. Improvement over the cationic starches is shown in reproducibility of batches, high solution stability, high wet web strength, better compatibility with other components in the furnish (salts, size, fillers), lower BOD (biological oxygen demand), higher retention of fines and higher dry strength, dry toughness and wet strength and toughness in the resulting paper. With regard to the wet strength agents, improvement over urea/formaldehyde resins is indicated by the high curing rate on the machine. Advantage over the melamine-formaldehyde resins is indicated by higher water absorbency rate (in nonsized compositions), higher retention of fines, and higher wet toughness of the resulting paper. Advantages over nonionic polyvinyl alcohols as a wet-end additive are easier process control, better retention of fines, and better sheet properties, including paper wet strength capability. The improvement over the use of other cationic polyvinyl alcohol is demonstrated by wet strength capability, and the process advantages mentioned above.

Thus, the preparation of certain interaction products of polyvinyl alcohol and cationic melamine-formaldehyde resin acid colloid are provided which are highly adsorbent to cellulose pulp and as such are eminently suitable for application in the paper industry. These products are capable of forming water resistant products on drying, yet also exhibit good solution stability at solution concentrations of up to about 3.75 weight percent or even higher. These interaction products can be prepared more readily and at lower cost to the customer than previously described highly adsorbent polyvinyl alcohols. They do require, however, rather specific conditions for their preparation to obtain products with enhanced properties over other wet-end additives to the paper making process. The enhanced properties of good solution stability, high adsorption capacity on the cellulose pulp, increased processing capability and control and improved paper properties render the interaction properties of the present invention particularly suitable for use in the wet end of the paper making machine permitting also lower overall costs to the paper mill.

The polyvinyl alcohol polymer component of the product of the present invention can be a "completely" hydrolyzed grade (mole percent hydrolysis of acetate groups 99.0 to about 100%), a partially hydrolyzed grade (percent hydrolysis 80-90%), a polymer of intermediate level of hydrolysis, or blends thereof. The completely hydrolyzed grades and also the higher molecular weight commercial grades are preferred when papers are desired with the highest wet strength properties. The polyvinyl alcohol should have a degree of polymerization of from about 600 to about 3000, as reflected in the inherent viscosity values ($\pi$inh) of from about 0.3 to about 1.4 dl/g. The inherent viscosity is measured in water at 30° C. at a concentration of 0.5 g/dl. This approximately corresponds for many commerical grades of polyvinyl alcohol to a solution viscosity (4% aqueous at 20° C., Hoeppler falling ball method), of from about 4 to about 160 cps, with about 10-70 centipoises being preferred.

The polyvinyl alcohol component of the present invention can also be a copolymer of vinyl alcohol, such as one obtained by hydrolyzing a copolymer of vinyl acetate with small amounts (up to about 15 mole percent) of other monomers. Suitable comonomers are e.g. esters of acrylic acid, methacrylic acid, maleic or fumaric acids, itaconic acid, etc. Also, copolymerization of vinyl acetate with hydrocarbons e.g. $\alpha$-olefins such as ethylene, propylene or octadecene, etc., with higher vinyl esters such as vinyl butyrate, 2-ethyl hexoate, stearate, trimethyl acetate, or homologues thereof ("VV-10" type of vinyl esters sold by Shell Chem. Co.), etc. gives copolymers that can be hydrolyzed to suitable polyvinyl alcohol copolymers. Other suitable comonomers are N-substituted acrylamides, vinyl fluoride, allyl acetate, allyl alcohol, etc. Also the free unsaturated acids such as acrylic acid, methacrylic acid, monomethyl maleate, etc. can act as comonomers, although final product stability (that is, after reaction with melamine-formaldehyde resins) is reduced.

The other major component, the cationic melamine-formaldehyde resin acid colloid, is a colloidal solution of low molecular weight polymer (MW of about 1700) which results when trimethylol melamine (TMM) (or the slightly polymerized TMM furnished by certain suppliers for ease of solution in water, such as the American Cyanamid Corporation product "Parez" 607) is dissolved in water containing hydrochloric acid (about 0.8 mole HCl per mole of TMM) and aged at room temperature for at least one hour. These colloidal particles are positively charged (cationic), and are known to adsorb irreversibly, even at very low concentrations, onto negatively charged cellulose fibers. These are called the "regular" colloids.

A detailed discussion of the melamine-formaldehyde resin acid colloids is given in TAPPI Monograph Series No. 29, "Wet Strength in Paper and Paperboard", (John Weidner, editor, Tech. Assoc. of the Pulp and Paper Industry, NYC, (1965), pages 20-32). Included in this discussion and suitable for use in the products of the present invention are so-called "high efficiency" melamine colloids, in which 1 to 7 moles of extra formaldehyde per mole of TMM are added to the TMM, and the optimum HCl/TMM mole ratio is reduced from about 0.8 to about 0.6. For maximum effectiveness, the "high efficiency" colloids are preferred. We have also found some advantage in ultimate paper properties when the "high efficiency" melamine-formaldehyde colloid is prepared by dissolving the TMM in cold water, followed by the addition of the acid. The preparation of the melamine-formaldehyde component by this "cold" procedure is described below.

In order to avoid poor solution and binding properties the polyvinyl alcohol should not be present in solution during the preparation of the melamine-formaldehyde resin acid colloid.

In the preparation of the "high efficiency" type of cationic melamine formaldehyde resin acid colloid one can add aldehydes other than formaldehyde during the ripening process for the colloid. These aldehydes can have up to about ten carbon atoms. Concentrations can be 8-100% by weight based on the weight of trimethylolmelamine. The types of aldehydes which can be used include simple homologues of formaldehyde, including branched-chain types. Examples are acetaldehyde, propionaldehyde, butyraldehyde, or 2-ethyl hexyl aldehyde. Acetaldehyde is particularly effective, especially at lower concentrations (see Example 14). Also useful are substituted aldehydes such as phenyl acetaldehyde, chloroacetaldehyde, 3-methoxypropionaldehyde, aldol and crotonaldehyde. Polyaldehydes which can be used include glutaraldehyde, glyoxal, adipaldehyde and terephthalaldehyde. Glutaraldehyde is particularly useful (see Example 15) in giving unusually high filler retention, Scott internal bond strength and wet tensile energy adsorption values.

The optimum HCl/TMM mole ratio with the addition of the higher aldehydes is closer to 0.8 than to 0.6.

Other components can also be present during the reaction of polyvinyl alcohol and melamine-formaldehyde resin acid colloid which components can act as extenders to reduce cost, while not lowering certain properties such as pigment retention. These include unmodified starches, degraded (acid modified, enzyme converted) starches, modified starches such as hypochlorite-oxidized starch, or starch derivatives such as hydroxyethyl starch or cationic starches. The amount of starch that can be added can be as high as about 6 parts by weight of the above-mentioned starch to 1 part by weight of the polyvinyl alcohol to form for example a 6/1/1 starch/polyvinyl alcohol/melamine formaldehyde interaction product and still get some improvement over the use of starch/melamine-formaldehyde interaction products. For example see Tables XI and XII in Example 13 in which the advantage of 3/1/1 starch/polyvinylalcohol/melamine-formaldehyde is shown over a 3/1 starch/melamine-formaldehyde.

The polyvinyl alcohol/melamine-formaldehyde resin ratio, on a dry basis, can be from about 0.4/1 to about 5/1 by weight. Higher ratios lead to a low adsorption level on the pulp. On the other hand, too low a ratio leads to brittle product, which is reflected in reduced physical properties of the resulting paper.

The polyvinyl alcohol and the melamine-formaldehyde resin acid colloid can be interacted by mixing aqueous solutions of each for several hours at ambient temperatures or by heating (30°-90° C. from about 3 to about 15 minutes), or by slurrying polyvinyl alcohol powder or granules in the melamine-formaldehyde acid colloid, followed by heating and stirring at about 80°-95° C. until the polyvinyl alcohol is dissolved. It is important, however, in all variations that the overall solids concentration after mixing be from about 0.7 to about 3.75% by weight or even higher up to a level that will not cause gelation to a stage of no flow under the force of gravity but not in excess of 6% by weight. At higher concentrations, the viscosity of the mixture increases more rapidly than is probably useful, and leads to gel formation. At 8% solids concentration gelation could result in a few minutes, and at 5% concentration, depending on how favorable other conditions are, gelation might or might not occur in about 48 hours. Preferably, the overall solids concentration should be between about 2%-3% by weight.

One of the most economical ways to prepare the product is as follows. The trimethylol melamine is dissolved and ripened to the oligomer in water and hydrochloric acid at room temperature in an acid resistant tank. It is then pumped into another tank (interaction tank) where it is diluted with water to about a 0.6% by weight concentration. In a third tank polyvinyl alcohol is dissolved with heat and stirring, to give a 10% by weight solution. The latter is then pumped hot into the interaction tank (containg the melamine-formaldehyde resin acid colloid) and the mixture is stirred slightly to form the final product. Preferably from about 0.6/1 to about 2/1 polyvinyl alcohol/melamine-formaldehyde ratio and about 2% by weight overall solids concentration is employed. The temperature of the reaction mixture is then about 33° C., which is high enough to insure product formation within about 15 minutes mixing time. The mixing temperature can be ambient (about 20° C.) if about 24 hours mixing time is allowed.

An alternative route to the interaction product, as mentioned above is to add the powdered polyvinyl alcohol directly to the diluted melamine-formaldehyde resin acid colloid in the interaction tank to form a slurry, and then heat to about 85°–90° C. for 0.25 hour to 2 hours, or until the polyvinyl alcohol dissolves. Advantages of this route are that solution of the polyvinyl alcohol is rapid in such a medium (about 15 minutes) and the third tank is not required. The disadvantage of the latter method is that more energy is required to heat up a larger volume of solution.

The products from both procedures are shelf stable (with regard to viscosity, activity) for at least three weeks. We have observed no change in solution viscosities in several cases for over three months.

Blends of certain grades of solid polyvinyl alcohol in powder or granular form, with solid, water or aqueous acid soluble condensation products of melamine with 3 moles of formaldehyde can also be used, e.g., by an adaptation of the slurry procedure. The dry blend can be added to water or aqueous acid plus additional formaldehyde if desired, preferably cold to dissolve the melamine-formaldehyde condensation products and convert them to the cationic resin acid colloid, while the polyvinyl alcohol remains in substantially undissolved form as a slurry. Then with an appropriate amount of water added to give ultimately about 0.7% to about 6% solids solution, the slurry is heated as before to dissolve and react the polyvinyl alcohol. The ratio of polyvinyl alcohol/melamine-formaldehyde resin acid colloid can be from about 0.4/1 to about 5/1 by weight. The polyvinyl alcohol used should have a cold water solubles content as low as possible; a grade with about 8% by weight maximum cold water solubles content might be acceptable while a grade with about 4.5% by weight maximum would be preferable. Maximum cold water solubles content of about 2% by weight is most desirable. The melamine-formaldehyde resin acid colloid should be prepared under milder conditions than the previous procedures, such as using higher dilution to prevent gelation: 9% by weight rather than the usual 14–18% by weight solids concentration gave good results.

The structure of the polyvinyl alcohol/melamine-formaldehyde interaction products of this invention have not been precisely determined. However, the infrared spectra of cast films indicated chemical interaction of the polyvinyl alcohol and the melamine-formaldehyde resin through the —OH groups to form graft copolymers.

The polyvinyl alcohol/melamine-formaldehyde product is preferably employed using the conventional methods of preparing paper sheets and other cellulosic products. Preferably, interaction with cellulose pulp material is carried out by internal addition to the cellulose pulp prior to formation of the paper sheet. Thus the aqueous solution of the interaction product may be added to the aqueous suspension of the paper stock while the latter is in the head box of the Fourdrinier, at the fan pump, in the stock chest, the hydropulper or any other point in the process prior to the point of sheet formation. The high adsorption rate of the polyvinyl alcohol/melamine-formaldehyde interaction product with the pulp permits many options in this regard. Among the variety of pulps which may be effectively treated are bleached and unbleached sulfate (kraft), bleached and unbleached sulfite, soda, neutral sulfite, semichemical, groundwood or blends of these fibers. In addition, fibers or viscose rayon, glass, regenerated cellulose, polyamide, polyester of polyvinyl alcohol can also be used in conjunction with the cellulose pulp. The preferred pH range of the pulp stock containing the polyvinyl alcohol/melamine-formaldehyde interaction product is from about 4 to about 8; with good adsorption and filler retention demonstrated over this range. The best wet strength properties of the resulting paper occur in the pH range of from about 4 to about 6.5.

Materials which could be added to the pulp slurry along with the polyvinyl alcohol/melamine-formaldehyde interaction product include cationic surfactants, cationic urea-formaldehyde resins, or cationic polyacrylamides, Also, polymers derived from polyamides containing amino groups along the polymer backbone, and reacted with epichlorohydrin (such as "Kymene" 557 from Hercules) can be added. Anionic polyacrylamide polymers, fortified rosin size, fillers, pigments, alum, etc. also can be present.

The sheet is then formed, pressed and dried by conventional means. The latter step serves to cure the polyvinyl alcohol/melamine-formaldehyde interaction product to its water insensitive state. Good runnability and good paper formation has been exhibited.

The amount of polyvinyl alcohol/melamine-formaldehyde interaction product added to the pulp slurry ranges from about 0.02 to about 10%, based on the dry weight of the pulp. The preferred range is from about 0.05% to about 3%, and will depend on the characteristics desired in the finished paper product, the type of pulp, and the specific operating conditions. Thus too little polyvinyl alcohol/melamine-formaldehyde in the slurry will give too low a property enhancement to be of interest. Too high a polyvinyl alcohol/melamine-formaldehyde could be uneconomic.

The following examples serve to illustrate the present invention. All parts and percentages and proportions are by weight unless otherwise indicated.

Preparation of melamine-formaldehyde resin acid colloids

EXAMPLE A

"High efficiency" melamine-formaldehyde resin acid colloid was prepared by adding 13.2 g of reagent grade concentrated hydrochloric acid to 365 g of distilled water. Then with stirring, 50 g of trimethylol melamine powder was added, followed with 95 g of 37% aqueous formaldehyde solution. After slow stirring overnight at room temperature, the expected blue haze was evident. The acid colloid was diluted with 365 g of distilled water, to give 7.4% solids (determined by drying in a circulating air oven at 110° C./1 hour). This is about 74% of theory if no formaldehyde is lost during the drying process. The above initial ratios give 0.6 moles of HCl/mole of trimethylolmelamine, and 5 moles of formaldehyde/mole of trimethylolmelamine. Addition of a drop of concentrated HCl to a few milliliters of the acid colloid led to immediate coagulation, as expected if the melamine-formaldehyde acid colloid was adequately aged. The pH of the colloid was 1.8. The stability of the acid colloid was excellent for at least one month.

EXAMPLE B

An alternative method for preparing the melamine-formaldehyde resin acid colloids is as follows. Reagent grade concentrated HCl (11.6 g) was added to 346 g of distilled water. Then, with stirring, 43.2 g of commercial spray dried trimethylolmelamine ("Parez" 607, from American Cyanamid Corporation) were added. The solution was slowly stirred overnight at room temperature. The acid colloid was diluted with 346 g of distilled water, to give 5.70% solids colloidal dispersion. The mole ratio of HCl/TMM was 0.6/1.0.

EXAMPLE C

Another alternative preparation of melamine-formaldehyde resin acid colloid is illustrated below. Reagent grade concentrated HCl (15.8 g) was added to 390 g of distilled H$_2$O. Then, with stirring 43.2 g of "Parez" 607 was added slowly. The solution was then stirred overnight at room temperature. The acid colloid was diluted with 340 g of distilled water, to give a 6.6% solids colloidal dispersion. The mole ratio of HCl/TMM was 0.8/1.0.

EXAMPLE D

The "cold" procedure for preparing melamine-formaldehyde resin acid colloid is illustrated below. The component ratios are the same as in Example A. To 150 g of distilled water cooled to 14° C. in an ice bath, was added 25 g of trimethylolmelamine with stirring. Then 47.5 g of 37% formaldehyde was added, and to the suspension was added 6.6 g of concentrated HCl in 32.5 g of distilled water. After several hours of stirring the suspension became a milky solution. The temperature was allowed to rise to ambient overnight, with slow stirring, then diluted with 182 g of distilled water. Percent solids was 6.9%.

Preparation of polyvinyl alcohol/melamine-formaldehyde interaction products

EXAMPLE 1

The "slurry technique" is illustrated in this example. To 10.4 g of "high efficiency" type melamine formaldehyde resin acid colloid (7.2% solids, prepared according to the method of Example A) was added 96 g of distilled water, with slow stirring, at room temperature. To the above was added with stirring 1.5 g of a medium molecular weight, fully hydrolyzed grade of a commercial polyvinyl alcohol powder having a 4% aqueous solution viscosity at 20° C. of 30 mPa.s (30 cps), about 1% acetate groups, over 99.0% passing through a #10 sieve. The slurry was then heated with stirring to 85°–95° C. for 15 minutes, in which time the polyvinyl alcohol appeared to be completely dissolved. The clear solution of product was cooled to room temperature. The pH was about 2.8, solids content 2.0%, and solution viscosity low (Brookfield less than 1 cps). The polyvinyl alcohol/melamine-formaldehyde resin ratio was 2/1. Interaction products of this type attempted at 12% total solids failed (gelled in a few minutes) also failed at 4% solids (gelled in less than 16 hours), but was stable at 2.9% solids.

EXAMPLE 2

This example is similar to Example 1 except for using melamine-formaldehyde resin acid colloid prepared according to the method of Example B.

The run was essentially successful in this case even with 5% total solids present (although the viscosity did rise to about 3.2 cps after 48 hours, and traces of gel were evident). The adsorption efficiency on bleached cellulose pulp at a pH of 4.0 was greater than 73% (as compared to about 18% for straight polyvinyl alcohol).

EXAMPLE 3

This example is similar to Example 1, except for using melamine-formaldehyde resin acid colloid prepared according to the method of Example D.

Successful products resulted at 2% level and at 2.7% solids but failed at 6% solids (gelled within 16 hours), was stable at 2.9% solids.

EXAMPLE 4

To a 250 ml Erlenmeyer flask containing a magnetic stirring bar was added 55.6 g of a 4.05% aqueous solution of the polyvinyl alcohol employed in Example 1. To this solution, at room temperature, was added, with stirring, 10.5 g of a melamine-formaldehyde resin acid colloid, 7.15% solids, prepared according to the method of Example D. This was followed with 84 g of distilled water, and the temperature was then raised to 65° C. for 15 minutes. An active, stable product resulted, the polyvinyl alcohol/melamine-formaldehyde weight ratio was 3/1, and solids in solution were 1.9%.

Similar successful examples were run with other grades of polyvinyl alcohol, with various melamine-formaldehyde resin acid colloids, with polyvinyl alcohol copolymers at different polyvinyl alcohol/melamine-formaldehyde ratios, and in the presence of corn starch or potato starch. Also successful was the addition of a hot concentrated (10%) solution of polyvinyl alcohol to the diluted (0.6%) melamine-formaldehyde resin acid colloid. In fact this is one of the preferred procedures of preparing the polyvinyl alcohol/melamine-formaldehyde resin interaction products of the present invention.

COMPARATIVE EXAMPLE 1

A 10.1% solution of the polyvinyl alcohol employed in Example 1 (66.6 g) was mixed with a 7.2% melamine-formaldehyde resin acid colloid ("high efficiency" type) (31.2 g) plus 2.2 g of distilled water at room temperature to give a 3/1 polyvinyl alcohol/melamine-formaldehyde blend at 8.7% overall solids. The viscosity of the "solution" rose rapidly; from 6.3 poises (as measured with Gardner Holdt calibrated viscosity tubes) after about one minute after mixing, to greater than 148 poises after 30 minutes, to form a firm gel.

COMPARATIVE EXAMPLE 2

To 37.2 g of a 7.2% melamine-formaldehyde resin acid colloid ("high efficiency" type) was added 158 g of water and then, with stirring 5.36 g of the polyvinyl alcohol powder employed in Example 1. The polyvinyl alcohol/melamine-formaldehyde ratio was 2/1, and the solids content of the product was 4%. The slurry was then heated to 85° C., with stirring. A gel resulted in less than 16 hours.

COMPARATIVE EXAMPLE 3

To a solution of 4.4 g of medium molecular weight fully hydrolyzed grade of a commercial polyvinyl alcohol [having a 4% aqueous solution viscosity at 20° C. of 14 mPa s (cps) and about 1% acetate groups] in 100 mils of water was added 1 g of "Parez" 607, TMM with stirring. The TMM slowly dissolved. The pH was then lowered by addition of 2.9 g of concentrated HCl. After stirring 16 hours at room temperature, a colloidal solution resulted. The product activity was very low (adsorption efficiency on cellulose pulp only 8% at pH 4.5).

EXAMPLE 5

As suggested above, interaction between polyvinyl alcohol and the melamine-formaldehyde resin acid colloid to form a new product is indicated by:

(1) the marked increase in viscosity which occurs when the components are mixed at somewhat higher concentrations than within the scope of the present invention, but otherwise under the same or even milder reaction conditions;

(2) the marked increase in adsorption efficiency on cellulose pulp compared to that obtained when straight polyvinyl alcohol is used which indicates a polyvinyl alcohol with cationic groups. This is shown in Table I.

TABLE I

| Composition of Additive to Pulp[a] | Percent Adsorption of Additive on Pulp[b] |
|---|---|
| PVA | 27 |
| 3/1 PVA/MF (HE) | 69 |
| 2/1 PVA/MF (HE) | 94 |
| MF (HE) | 89 |
| Cationic Starch | 32 |

[a]All applied at 1.6% concentration based on dry pulp. The polyvinyl alcohol was that employed in Example 1. MF (HE) was the melamine-formaldehyde resin acid colloid, "High Efficiency" type. The cationic starch was "Cato" 15 (National Starch).
[b]The pulp used was unbleached western kraft, Canadian standard freeness (CSF) value of 600. The consistency of the beaten stock in the slurry was 2.5%. The initial concentration of the additive in the aqueous phase was 0.041%. A gravimetric procedure was used for determining the concentration of the additive in the filtrate after exposure to the pulp. The pH of the stock was 4.5 except in the case of straight polyvinyl alcohol, where the pH was 6.5.

It is evident from Table I that adsorption level of the polyvinyl alcohol/melamine-formaldehyde "high efficiency" interaction products on the pulp are much higher than straight polyvinyl alcohol or even than a commercial cationic starch.

(3) Spectral data also indicate interaction between the polyvinyl alcohol and the melamine-formaldehyde resin acid colloid. (a) The solutions gave colored reaction products with boric acid-iodine, as does straight polyvinyl alcohol. However, the intensity of the complex was less than expected from straight polyvinyl alcohol. (b) In the infrared spectra of cast films air-dried at room temperature, the 1000 $cm^{-1}$ peak for the melamine-formaldehyde resin acid colloid has disappeared, suggesting that most of the methylol groups have reacted. Also, the polyvinyl alcohol absorption at about 830 $cm^{-1}$ ascribed to the —OH bond has decreased, suggesting some reaction with these groups.

EXAMPLE 6

Increased adsorption efficiency over straight polyvinyl/alcohol and increased adsorption rate over commercial cationic wet-end additives (such as "Kymene" 557 presumably a cationic polyamide containing amino groups post-reacted with epichlorohydrin, obtained from Hercules) were shown using a mixture of bleached pulps (50/50 bleached northern softwood sulfite/bleached northern hardwood kraft) with other conditions being the same as in Example 5. Results are summarized in Table II. Thus, the 3/1 polyvinyl alcohol/melamine-formaldehyde interaction product has an adsorption efficiency after 15 minutes exposure to the wet pulp of about 80%, while straight polyvinyl straight polyvinyl alcohol has only 18%. Also, the polyvinyl alcohol/melamine-formaldehyde achieved its maximum adsorption level within 1 minute, while "Kymene" 557, did not achieve high levels of adsorption for over 5–10 minutes. Thus polyvinyl alcohol/melamine-formaldehyde offers more flexibility in points of addition (fan pump, machine chest, head box, etc.) to the Fourdrinier paper machine than other cationic wet-end additives.

TABLE II

| Composition of Additive to Pulp | Percent Adsorption of Additive on Pulp after indicated minutes of exposure | | | |
|---|---|---|---|---|
| | 1 | 5 | 10 | 15 |
| PVA | 12 | 14 | 16 | 18 |
| "Kymene" 557 | 53 | 68 | — | 77 |
| 3/1 PVA/MF (HE) | 84 | 79 | — | 80 |

EXAMPLE 7

As mentioned above, the solutions of the polyvinyl alcohol/melamine-formaldehyde interaction products of the present invention possess excellent shelf stability. Thus no buildup of viscosity or gel occurs over a period of weeks-to-months, and activity remains high for at least two months for the polyvinyl alcohol/melamine-formaldehyde products of the above examples. Also, unlike the situation in cationic starch solutions, no tendency for mold buildup is seen.

These products also are heat curable on the paper machine. That is, significant levels of permanent wet strength are rapidly attained, apparently faster than with urea-formaldehyde resins, and probably as fast as with straight melamine-formaldehyde resins. On the other hand, recovery of waste paper or broke is faster than with melamine-formaldehyde resins by heating under very mild acid conditions (see Example 12).

This example quantitatively indicates the advantages in wet web strength for the polyvinyl alcohol/melamine-formaldehyde interaction products of the present invention. Paper was made on a 36 inch wide Fourdrinier, operated at 100 feet/min. Pulp was a mixture of 70/30 hardwood bleached kraft/softwood bleached kraft, refined to 500 CSF. The additives were introduced to the furnish at the fan pump. For wet web studies, 2" wide strips were cut off the edge of the web at the couch roll, and the breaking force at two different water loadings was measured on an Instron. The breaking length (strength) was calculated, and interpolated values of the breaking length were compared at equivalent water loadings (35% solids), and at concentrations of the additives at which they are usually used for dry and/or wet paper strength applications. These are given in Table III.

TABLE III

| Additive | Conc., % | Breaking Length Meters | Primary Use |
|---|---|---|---|
| "Kymene" 557H | 0.6 | 57 | for wet strength |
| "Cato" 9 cationic starch | 0.6 | 63 | for dry strength |
|  | 2.0 | est. 60–65 | " |
| MF Resin | 2.0 | 58 | for wet strength |
| None | — | 71 |  |
| 3/1 PVA/MF of Example 4 | 0.6 | 91 |  |
|  | 2.0 | 96 |  |

It can be seen that most of these additives actually decrease the strength of the wet web (presumably by interfering with cellulose pulp-pulp interactions). The polyvinyl alcohol/melamine-formaldehyde interaction product, however, truly enhances the wet web strength.

EXAMPLE 8

This example demonstrates the higher retention of cellulosic fines possible with the use of polyvinyl alcohol/melamine-formaldehyde as an additive. The processing advantages that result with high first pass retention are recognized in the literature (K. W. Britt, Paper Trade Journal, Apr. 15, 1977, p. 36). Also, it is well known that retention of cellulosic fines (and also pigment and/or filler) can be markedly lower at the high shear rates experienced in the commercial paper mill than at the low shear rates in conventional lab tests. K. Britt has developed a single screen device for determination of cellulosic fines, filler and pigment in the laboratory, under conditions which approximate the turbulence experienced by the pulp stock as it drains in the initial sections of a paper machine wire. This is called the "dynamic drainage jar", or the "Britt Jar". This is described in TAPPI Report No. 57, "Retention of Fine Solids During Paper Manufacture" (9/1/75). Appendix in Chapter 8 by K. W. Britt.

Following Britt's procedures, the following results summarized in Table IV were obtained for the 3/1 PVA/MF (HE) interaction product compared with two commercial cationic starches, at various additive concentrations and at various pH's of the pulp stock.

TABLE IV

| ADDITIVE | CONCENTRATION[a] (%) | pH | RETENTION[b] (%) |
|---|---|---|---|
| None | — | 4.5 | 39.5 |
|  |  | 5.5 | 34.3 |
|  |  | 6.5 | 45.4 |
| Cationic Starch[c] | 0.1 | 4.5 | 37.9 |
|  |  | 5.5 | 50.8 |
|  |  | 6.5 | 54.3 |
|  | 0.7 | 4.5 | 53.8 |
|  |  | 5.5 | 51.2 |
|  |  | 6.5 | 54.9 |
|  | 2.0 | 4.5 | 39.9 |
|  |  | 5.5 | 48.5 |
|  |  | 6.5 | 49.8 |
| 3/1 PVA/MF[d] | 0.1 | 4.5 | 62.4 |
|  |  | 5.5 | 50.8 |
|  |  | 6.5 | 46.9 |
|  | 0.7 | 4.5 | 61.3 |
|  |  | 5.5 | 53.3 |
|  |  | 6.5 | 45.2 |
|  | 2.0 | 4.5 | 84.0 |
|  |  | 5.5 | 71.9 |
|  |  | 6.5 | 62.7 |
| Cationic Starch[e] | 2.0 | 6.5 | 31.4 |

[a]Based on dry pulp
[b]Based on dry pulp, as determined in Britt Jar, at 1000 rpm, Western unbleached kraft pulp, CSF 620, tap water used. Level of cellulosic fines in this pulp 9.3%.
[c]"Cato" 15, National Starch.
[d]Prepared by method of Example 4.
[e]"Cato" 9, National Starch.

It is evident that pH 4.5 is optimum for retention purposes for the polyvinyl alcohol/melamine-formaldehyde, while 6.5 is perhaps best for the cationic starches. It is also evident that for each additive at its optimum pH, the polyvinyl alcohol/melamine-formaldehyde is superior to the cationic starches at all additive concentrations.

Similar advantages were shown in retention of clay or of pigment ($TiO_2$) on the unbleached kraft pulp used above, and also on bleached pulps, as shown in Tables V and VI.

TABLE V

| Additive (2% Conc.) | % Clay Retention[a] |
|---|---|
| None | ~2 |
| Cationic Starch | 15 |
| MF (HE) Resin | 12 |
| 3/1 PVA/MF | 28 |

[a]50/50 Bleached softwood sulphite/bleached hardwood kraft pulps, CSF ~500. Britt Jar at 1000 rpm. Cationic starch was "Cato" 9. The polyvinyl alcohol/melamine-formaldehyde was prepared by method of Example 4.

TABLE VI

| Additive | Conc. | % $TiO_2$ Retention[a] |
|---|---|---|
| Cationic Starch | 0.7 | 22 |
|  | 2.0 | 37 |
| MF Resin | 2.0 | 16 |
| 3/1 PVA/MF | 0.7 | 45 |
|  | 2.0 | 58 |

[a]50/50 bleached softwood sulphite/bleached hardwood kraft pulps, CSF 500, Britt Jar at 1000 rpm. Concentration of additive based on pulp. The cationic starch was "Cato" 9. The PVA/MF was prepared by method of Example 4.

To show that these high levels of fines retention were not accompanied by overflocculation, which could hurt the paper properties or processing characteristics, the optical properties of the resulting paper were examined, and found to be excellent. This is discussed below in Example 9.

The following examples show the enhanced paper and paper-related products that can be obtained through the use of the polyvinyl alcohol/melamime-formaldehyde interaction products as additives to the paper machine.

EXAMPLE 9

Using paper manufactured on the Fourdrinier machine as described in Example 7, the scattering coefficient was determined as per TAPPI method T218-05-69 for determining reflectance, then using data in TAPPI 425-05-75 for SW values, dividing by the basis weight and multiplying by 10,000 to get values in $cm^2/g$. The data are given in Table VII, for paper containing 10% clay.

TABLE VII

| Additive | Conc., % | Scattering Coefficient(cm²/g)[a] |
|---|---|---|
| None | — | 395 |
| "Cato" 9 | 0.6 | 409 |
|  | 2.0 | 420 |
| "Cato" 15 | 0.6 | 416 |
|  | 2.0 | 382 |
| MF (HE) | 0.6 | 408 |
|  | 2.0 | 420 |
| 3/1 PVA/MF | 0.6 | 472 |
|  | 2.0 | 450 |

[a]70/30 Hardwood bleached kraft/softwood bleached kraft, CSF 500, concentration is based on dry pulp. The PVA/MF was made by method of Example 4.

The above shows the enhanced scattering with the PVA/MF interaction product, which suggests better paper formation and/or filler distribution in the paper.

EXAMPLE 10

Handsheets were prepared in a Noble and Wood sheet mold (8"×8"), pressed between rolls, and dried in a Noble and Wood Model E-8 drier. The pulp was unbleached western kraft refined to CSF 600. Tensile properties were determined as per TAPPI 494-05-70. Results are indicated in Table VIII.

TABLE VIII

| Additive | Conc., % | Dry Breaking Length (m) | Dry Tensile Energy Absorption (J/M²) |
|---|---|---|---|
| None | — | 4570 | 82 |
| MF (HE) | 0.7 | 5830 | 128 |
|  | 2.0 | 6070 | 131 |
| Cationic Starch ("Cato" 9) | 0.7 | 5480 | 123 |
|  | 2.0 | 6420 | 152 |
| Aminopolyamide epoxidized ("Kymene" 557) | 0.7 | 5820 | 126 |
| 3/1 PVA/MF (HE) of Ex. 3 | 0.7 | 6770 | 166 |
|  | 2.0 | 7740 | 174 |
| 3/1 PVA/MF (HE) of Ex. 1 | 0.7 | 7300 | 161 |
|  | 2.0 | 7430 | 176 |

It can be seen from these data that the PVA/MF interaction products exhibit superior dry strength and dry toughness over commercial additives, and, in fact, the PVA/MF's are better at 0.7% concentration than are the controls at 2%. Such advantage is also maintained in the presence of filler.

EXAMPLE 11

The PVA/MF interaction products are also quite effective wet strength agents for paper. This is shown in Table IX.

TABLE IX

| Additive | Wet Breaking Length[a] (m) | | Wet Tensile Energy Absorption[a] (J/m²) | |
|---|---|---|---|---|
|  | No Clay | With Clay | No Clay | With Clay |
| None | 260 | 350 | 4 | 5 |
| Cationic Starch[b] | 400 | 300 | 7 | 5 |
| Aminopolyamide-epoxidized[c] | 2300 | 1500 | 76 | 45 |
| MF (HE) | 1700 | 1200 | 55 | 36 |
| 2/1 PVA/MF (HE) | 1800 | 1200 | 76 | 44 |
| 3/1 PVA/MF (HE) of Example 4 | | | | |

[a]determined on unbleached western kraft pulp, refined to CSF 600. Data on handsheets; additive level 2% based on dry pulp, filler level 10% clay based on dry pulp.
[b]"Cato" 9.
[c]"Kymene" 557.

The PVA/MF interaction product demonstrates better wet toughness, wet tensile energy absorption (TEA), than the commercial straight MF resin, or of course, the cationic starch, which is known to have no wet strength properties. The aminopolyamide-epoxidized appears to be somewhat better than the PVA/MF product of the present invention in wet strength (wet breaking length). However, the aminopolyamide-epoxidized is much more expensive, and also is much inferior to the polyvinyl alcohol/melamine-formaldehyde product in ease of broke or waste paper recovery.

EXAMPLE 12

The present example illustrates that epoxidized aminopolyamide ("Kymene" 557) is much inferior compared to the polyvinyl alcohol/melamine-formaldehyde interaction product of this invention in ease of broke or waste paper recovery. This is demonstrated in Table X, where data on paper made from bleached kraft pulps on a Fourdrinier show the loss in wet strength of the paper on heating the paper in very dilute acid solution. Such loss in strength is of course necessary for ready paper recovery. Apparently paper containing polyvinyl alcohol/melamine-formaldehyde additive is more readily broken down by dilute acid than is straight melamine-formaldehyde resin, and quite evidently much more readily broken down than is the epoxidized aminopolyamide.

TABLE X

| Additive | Wet Breaking Length[a] (m) | | Wet Tensile Energy Absorption[a] (J/m²) | |
|---|---|---|---|---|
|  | H₂O/ 25° C./ 0.5 hrs | 0.025N HCL/ 90° C./ 0.5 hrs | H₂O/ 25° C./ 0.5 hrs | 0.025N HCl/ 90° C./ 0.5 hrs |
| None | 78 | 78 | 1.2 | 1.2 |
| Cationic Starch[b] | 197 | 130 | 1.6 | 1.6 |
| 3/1 PVA/MV (HE) of Ex. 4 | 1012 | 213 | 28.4 | 2.1 |
| MF (HE) | 1497 | 409 | 24.4 | 2.6 |
| Aminopolyamide epoxidized[c] | ~1500 | ~1490 | ~28.0 | ~27.0 |

[a]Machine sheets ex Fourdrinier, 70/30 bleached hardwood/softwood kraft blend, refined to CSF 500. All additives at 2% concentration based on dry pulp.
[b]"Cato" 9.
[c]"Kymene" 557. The change in wet property values on acid treatment using this additive were estimated from data in paper by M. E. Carr et. al., TAPPI 60, No. 10, Oct (1977) pp 66-69.

EXAMPLE 13

A 3/1 by weight raw potato starch/MF (HE) aqueous solution at 2% concentration was made in analogous fashion to the 3/1 PVA/MF (HE) interaction product. Also, a 3/1/1 starch/PVA/MF (HE) interaction product was made in similar fashion. In these cases, the MF (HE) resin acid colloid was made as in Example A, and the latter was then reacted with the potato starch and/or the polyvinyl alcohol as in Example 4. The starch/melamine-formaldehyde and the starch-/polyvinyl alcohol/melamine-formaldehyde solutions were stable for less than three (3) weeks, while the polyvinyl alcohol/melamine-formaldehyde was stable for over three (3) months. Handsheets were prepared using bleached sulfite pulp. A list of properties of the handsheets, along with a control containing no wet-end additive is given in Table XI. Thus the superiority of the 3/1 polyvinyl alcohol/melamine-formaldehyde over the 3/1 starch/melamine formaldehyde is shown in solution stability and in paper properties. In fact, in several properties, the 3/1 polyvinyl alcohol/melamine-formaldehyde at 0.7% is equal or superior to the 3/1 starch/melamine-formaldehyde at 2% concentration. Also the 3/1/1 starch/polyvinyl alcohol/melamine-formaldehyde is superior to 3/1 starch/melamine-formaldehyde.

EXAMPLE 14

This example illustrates the use of higher aldehydes to modify the PVA/MF interaction products. In run (C) "high efficiency" melamine-formaldehyde resin acid colloid was prepared as in Example A. In runs (D) and (E) in place of the additional formaldehyde acetaldehyde was added during the "ripening" of the MF resin acid colloid. These were then added to the pulp and handsheets were made. In Table XIII are shown the adsorption of the additives to the pulp and the resulting paper handsheet properties. It is clear that results with additional acetaldehyde were as good, at least in dry properties, as with the additional formaldehyde.

TABLE XI

| | | Additive | | | |
|---|---|---|---|---|---|
| | | 3/1 PVA/MF | | 3/1 Starch/MF | 3/1/1 Starch/PVA/MF |
| Handsheet Properties[a] | None | 0.7% | 2.0% | 2.0% | 2.0% |
| Burst Factor (Mullen) | 19 | 30 | 35 | 25 | 31 |
| Tear Factor (Elmendorff) | 88 | 114 | 118 | 69 | 104 |
| Fold Endurance (Transverse, MIT) | 12 | 23 | 33 (117)[b] | 23 | 38 |
| Dry Breaking Length (m) | 2950 | 4200 | 4900 | 3760 | 4570 |
| Dry Tensile Energy Absorption (TEA) (J/m$^2$) | 35 | 83 | 80 | 77 | 84 |
| Dry Initial Modulus (KPSI) | 150 | 220 | 290 | 250 | 240 |
| Wet Breaking Length (m) | 230 | 360 | 630 | 270 | 290 |
| Wet Tensile Energy Absorption (TEA) (J/m$^2$) | 5 | 9 | 21 | 9 | 8 |
| Wet Initial Modulus (KPSI) | 8 | 8 | 15 | 9 | 10 |

[a]Bleached Northern Sulfite Pulp, CSF 500. Sheets aged one (1) month.
[b]Value in parenthesis for sheet aged two (2) months.

With clay at 10% concentration in the paper, similar advantages of 3/1 PVA/MF over 3/1 starch/MF were shown in burst, folding endurance and dry and wet breaking length and tensile energy absorption. Again the 3/1/1 starch/PVA/MF showed some advantages over 3/1 starch/MF. The results are summarized in Table XII.

TABLE XII

| | | Additive | | | |
|---|---|---|---|---|---|
| Handsheet Properties[a] | None[b] | 3/1 PVA/MF | | 3/1 Starch/MF | 3/1/1 Starch/PVA/MF |
| | | 0.7% | 2.0% | 2.0% | 2.0% |
| Burst Factor (Mullen) | 15 | 22 | 28 | 16 | 22 |
| Tear Factor (Elmendorff) | 100 | 111 | 111 | 109 | 105 |
| Fold Endurance (Transverse, MIT) | 7 | 10 | 26 | 12 | 15 |
| Dry Breaking Length (m) | 2600 | 3370 | 4090 | 2690 | 3440 |
| Dry TEA (J/m$^2$) | 26 | 52 | 75 | 49 | 57 |
| Dry Initial Modulus (KPSI) | 180 | 230 | 250 | 250 | 220 |
| Wet Breaking Length (m) | 160 | 180 | 540 | 160 | 230 |
| Wet TEA (J/m$^2$) | 3.5 | 5 | 18 | 5 | 6 |
| Wet Initial Modulus (KPSI) | 9 | 9 | 12 | 6 | 11 |

[a]Bleached Northern Sulfite Pulp, CSF 500. Sheets containing 10% clay, aged one (1) month.
[b]Values interpolated from handsheets containing 0% and 20% of clay.

TABLE XIII

Handsheet Properties[c]

| Additive[b] | On pulp (%)[a] | Burst Factor | Length (M) |
|---|---|---|---|
| (A) None | — | 39 | 5800 |
| (B) PVA | 4.9 | — | — |
| (C) 2/1 PVA/MF (formaldehyde) (66%)[d] | 96.8 | 48 | 6900 |
| (D) 2/1 PVA/MF (acetaldehyde) (66%)[d] | 94.9 | 49 | 7200 |
| (E) 2/1 PVA/MF (acetaldehyde) (23%)[d] | — | 49 | 7800 |

| Additive[b] | Dry Tensile Energy Absorption (J/M$^2$) | Scott[f] Internal Bonding | Wet Break Length (M)[e] |
|---|---|---|---|
| (A) None | 100 | 76 | 220 |
| (B) — | — | — | — |
| (C) 2/1 PVA/MF (formaldehyde) (66%)[d] | 105 | 97 | 1800 |
| (D) 2/1 PVA/MF (acetaldehyde) (66%)[d] | 124 | 105 | 1380 |
| (E) 2/1/PVA/MF (acetaldehyde) (23%)[d] | 142 | 105 | 1520 |

[a]Determined as described in footnote (b) of Table I.
[b]At 2% loading of additive based on dry pulp.
[c]Made with unbleached kraft pulp, CSF ~600, no filler or size present. Measurements using TAPPI procedures as in Table XI.
[d]The percent indicated is the concentration of the aldehyde on a weight basis, relative to the trimethylolmelamine used in making the MF resin acid colloid.
[e]Measured after exposure to H$_2$O/25° C./0.5 hr.
[f]In ft-lb × 10$^3$. TAPPI method #403 was followed.

EXAMPLE 15

This example illustrates the utility of PVA/MF interaction products, in which a dialdehyde, glutaraldehyde was added during the MF resin acid colloid ripening process. Runs (B), (C) and (D) were carried out following the general procedure of Example 14. Data are summarized in Table XIV, comparing the addition of glutaraldehyde with formaldehyde. The solution stability of the glutaraldehyde-modified product was considerably lower than the formaldehyde-modified products. Nevertheless, when used shortly after preparation, the filler retention in the pulp is surprisingly high using the glutaraldehyde. Also, good paper properties resulted even though the concentration of the products added to the pulp was lower than in Example 14. Improved solution stability (at least five days) was obtained with a lower level of added glutaraldehyde (13% by weight based on the MF resin).

TABLE XIV

| Additive(a) | Solution(e) Stability | Filler Retention (%)(c) | Scott Internal Bonding(d) |
|---|---|---|---|
| (A) None | — | 1.3 | 42 |
| (B) 2/1 PVA/MF (formaldehyde) (66%)(b) | >3 mo. | 5.2 | 49 |
| (C) 2/1 PVA/MF (formaldehyde) (23%)(b) | >3 mo. | 7.6 | 63 |
| (D) 2/1 PVA/MF (glutaraldehyde) (23%)(b) | ~48 hr. | 11.0 | 75 |

| Additive(a) | Wet Breaking Length (M)(d) | Wet Tensile Energy Absorption (J/M$^2$)(d) |
|---|---|---|
| (A) None | 220 | 4 |
| (B) 2/1 PVA/MF (formaldehyde) (66%)(b) | 840 | 17 |
| (C) 2/1 PVA/MF (formaldehyde) (23%)(b) | 900 | 18 |
| (D) 2/1 PVA/MF (glutaraldehyde) (23%)(b) | 1000 | 26 |

(a)At 0.7% concentration of additive based on pulp. No size or alum present. Pulp is unbleached kraft as used in Example 10.
(b)Concentration of aldehyde by weight, based on trimethylolmelamine.
(c)Clay filler data at low shear rate. Clay was added at 20% based on weight of dry pulp.
(d)At zero filler level. Data for Scott Internal Bonding in ft-lb × 1000.
(e)Refers to stability of additive solutions compared at 2% solids concentration.

EXAMPLE 16

In this example, Britt's procedures for the "dynamic drainage jar", which were discussed in Example 8, were modified so that a paper mat was formed during drainage. A PVA/MF interaction product was prepared with the two components in a 0.67/1 weight ratio. A 0.25% solids water slurry of 80/20/20 hardwood/softwood/clay filler composition was beaten in a blender, and then was treated with 1.25% aluminum sulfate (based on pulp) in the Britt Jar at 200 rpm. After 20 minutes, the PVA/MF interaction product was added. For comparison a run was made without the PVA/MF interaction product addition. Just prior to drainage, agitation was increased to 500 rpm to simulate the turbulent forces present on papermaking machines. Then agitation was terminated, and the paper mat was allowed to form. Results are summarized in Table XV.

TABLE XV

| 0.67/1 PVA/MF (%) | Fines Retained (%) | Paper Ash (%) | Paper Dry Breaking Length (%) |
|---|---|---|---|
| none | 71.9 | 8.0 | 1120 |
| 0.5 | 84.5 | 10.9 | 1469 |

I claim:
1. A process for preparing stable aqueous solution of cationic polyvinyl alcohol/melamine-formaldehyde resin interaction product comprising
  (a) preparing cationic melamine-formaldehyde resin acid colloid,
  (b) contacting said melamine-formaldehyde resin acid colloid with polyvinyl alcohol polymer by a method selected from the group consisting of
    (I) mixing said melamine-formaldehyde resin acid colloid with aqueous polyvinyl alcohol solution at ambient or elevated temperature for a sufficient time to yield said polyvinyl alcohol/melamine-formaldehyde resin interaction product at the given temperature, and
    (II) slurrying polyvinyl alcohol powder or granules in the melamine-formaldehyde resin acid colloid and heating and stirring at a temperature of from about 80° to about 95° C. until the polyvinyl alcohol is dissolved,
  provided, that there is sufficient water present to give a solids content of from about 0.7% by weight up to a level that will not cause gelation to a stage of no flow under the force of gravity in 48 hours, but not in excess of 6% by weight, the polyvinyl alcohol/melamine-formaldehyde resin acid colloid weight ratio, on a dry basis, being from about 0.4/1 to about 5/1.

2. The process of claim 1 wherein the solids content of said polyvinyl alcohol/melamine-formaldehyde resin acid colloid interaction product is from about 0.7 to about 3.75% by weight.

3. The process of claim 2 wherein the polyvinyl alcohol polymer is a copolymer of vinyl alcohol and up to about 10 mole % of a comonomer selected from the group consisting of α-olefins having 2 to 18 carbon atoms, vinyl esters of saturated carboxylic acids wherein the acid moiety has up to 18 carbon atoms, unsaturated mono- or dicarboxylic acids of 3 to 5 carbon atoms, and esters of said unsaturated mono- or dicarboxylic acids wherein the alcohol moiety has 1 to 8 carbon atoms, N-substituted amides of unsaturated monocarboxylic acids, allyl alcohol, allyl esters of saturated carboxylic acids wherein the acid moiety has up to 18 carbon atoms and vinyl halides.

4. The process of claim 2 wherein said melamine-formaldehyde resin acid colloid and polyvinyl alcohol solution are mixed at about ambient temperature for about 24 hours.

5. The process of claim 2 wherein said melamine-formaldehyde resin acid colloid and polyvinyl alcohol solution are mixed at a temperature of from about 30° to about 90° C. for a period of from about 3 to about 15 minutes.

6. The process of claim 2 wherein polyvinyl alcohol powder or granules are slurried in said melamine-formaldehyde resin acid colloid and the slurry is heated and stirred at a temperature of from about 80° to about 95° C. for a period of from about 0.25 to about 2 hours or until the polyvinyl alcohol dissolves.

7. The process of claim 2 wherein the melamine-formaldehyde resin acid colloid is prepared by adding, from about 8 to about 100 percent by weight, based on the weight of trimethylolmelamine, of aldehyde having up to about 10 carbon atoms, to trimethylolmelamine dissolved in water and aging said solution in the presence of about 0.6 to 0.8 mole of hydrochloric acid per mole of trimethylolmelamine.

8. The process of claim 7 wherein said aldehyde is selected from the group consisting of formaldehyde and its homologues, substituted aldehydes and polyaldehydes.

9. The process of claim 8 wherein said aldehyde is selected from the group consisting of formaldehyde, acetaldehyde and glutaraldehyde.

10. The process of claim 2 wherein sufficient water is employed to give a solids content of from about 2 to about 3% by weight.

11. The process of claim 10 wherein the polyvinyl alcohol/melamine-formaldehyde resin acid colloid weight ratio, on a dry basis, is from about 0.6/1 to about 2/1.

12. The process of claim 10 wherein the polyvinyl alcohol/melamine-formaldehyde resin acid colloid weight ratio, on a dry basis, is from about 2/1 to about 3/1.

13. The process of claim 10 wherein polyvinyl alcohol is dissolved in water with mixing and heating to give about 10% by weight solution, said hot polyvinyl alcohol solution is added to about 0.6% by weight of the melamine-formaldehyde resin acid colloid, said melamine-formaldehyde resin acid colloid being at about ambient temperature, and the resulting mixture is mildly stirred for about 15 minutes.

14. The process of claim 2 wherein said melamine-formaldehyde resin acid colloid and said polyvinyl alcohol are mixed in the presence of up to about 6 parts by weight, per 1 part by weight of polyvinyl alcohol, of starch selected from the group consisting of unmodified, modified and degraded starches and starch derivatives.

15. The process of claim 14 wherein said starch is present in an amount of about 3 parts by weight per 1 part by weight of polyvinyl alcohol.

16. The process of claims 2, 10, 11 or 15 wherein the polyvinyl alcohol polymer is at least about 99 mole % hydrolyzed and has an inherent viscosity of from about 0.3 to about 1.4 dl/g measured in water at 30° C. at a concentration of 0.5 g/dl.

* * * * *